United States Patent [19]
Hansen et al.

[11] Patent Number: 5,778,419
[45] Date of Patent: Jul. 7, 1998

[54] DRAM WITH HIGH BANDWIDTH INTERFACE THAT USES PACKETS AND ARBITRATION

[75] Inventors: Craig C. Hansen, Los Altos; Timothy B. Robinson, Boulder Creek; Alan G. Corry, Santa Clara, all of Calif.

[73] Assignee: Microunity Systems Engineering, Inc., Sunnyvale, Calif.

[21] Appl. No.: 606,342

[22] Filed: Feb. 23, 1996

Related U.S. Application Data

[63] Continuation-in-part of Ser. No. 516,036, Aug. 17, 1995.
[51] Int. Cl.[6] .................................................. G06F 12/00
[52] U.S. Cl. .............................. 711/112; 364/DIG. 1
[58] Field of Search ............................ 395/309, 439, 395/856, 200.03

[56] References Cited

U.S. PATENT DOCUMENTS

| | | | |
|---|---|---|---|
| 5,313,626 | 5/1994 | Harriman et al | 395/182.04 |
| 5,367,643 | 11/1994 | Chang et al. | 395/309 |
| 5,465,343 | 11/1995 | Henson et al. | 395/439 |
| 5,483,640 | 1/1996 | Isfeld et al. | 395/200.03 |
| 5,513,327 | 4/1996 | Farmwald et al. | 395/309 |
| 5,606,717 | 2/1997 | Farmwald et al. | 395/856 |

*Primary Examiner*—Tod R. Swann
*Assistant Examiner*—David Langjahr
*Attorney, Agent, or Firm*—McDermott, Will & Emery

[57] ABSTRACT

A memory chip for storage and retrieval of data transmitted as streams of data at sustained peak data transfer rates. The memory chip includes a memory device and an interface capable of achieving high bandwidth throughput. The memory device decodes, arbitrates between, and executes memory access commands, and generates memory access responses. The interface includes a data path, and a number of memory controllers. The interface receives and transmits input and output data streams, and the memory controllers control the flow of the input and output data streams within the memory chip. A packet buffer is coupled between the data path and the memory device. The packet buffer provides for temporary storage of memory access commands, response information, and forwarding data.

46 Claims, 10 Drawing Sheets

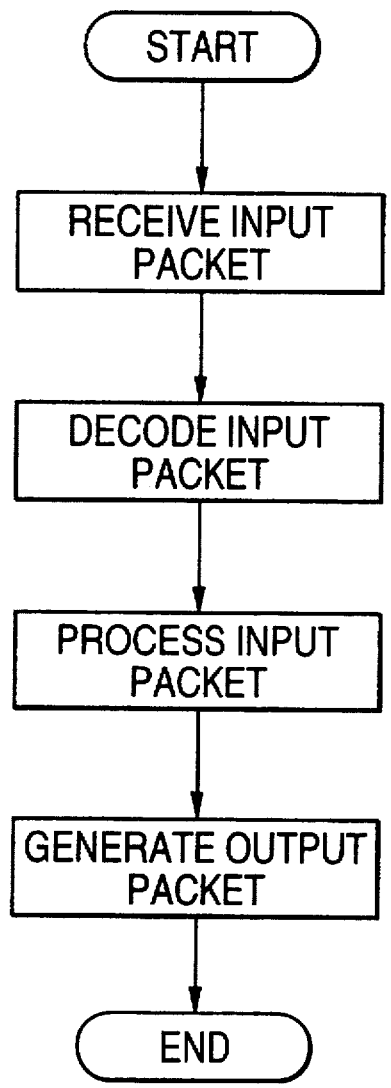

DRAM WITH HIGH BANDWIDTH INTERFACE THAT USES PACKETS AND ARBITRATION

This application is a Continuation-In-Part of U.S. patent application Ser. No. 08/516,036, filed on Aug. 17, 1995 pending

FIELD OF THE INVENTION

This invention relates to the field of dynamic random access memory ("DRAM") devices, and relates specifically to such a device with an on-chip programmable high bandwidth interface.

BACKGROUND OF THE INVENTION

Over the last 15 years there has been a 1000-fold increase in storage capacity of DRAM components. In contrast, the raw performance, as measured by bandwidth per package, has failed to improve so dramatically; the most significant improvement taking the form of wider interfaces, which over the same period have progressed from a single-bit width to the current 16-bit wide DRAM interface. While there seems to be no near term end to the growth of capacity per device, it is clear that the wider interface approach for increasing bandwidth cannot be scaled much further without a major penalty in packaging costs from increased pin count and added circuitry necessary for controlling factors, such as switching noise and ground bounce.

Additionally, the current state of the art in DRAM technology requires synchronized access. This is due to the fact that DRAMs generally lack any output timing signals indicating when a response to a read request is accessible. The technology, therefore, requires that a controller be synchronized with the timing of the DRAM device in order to access the response to a read request. This synchronization requirement inhibits design flexibility and increases the complexity of DRAM control circuitry and access protocol.

A known technique for increasing bandwidth involves dividing DRAMs into multiple banks, each corresponding to a different region of the DRAM's storage space, and providing the DRAM with a set of column latches, each able to latch data from a row of DRAM storage. Dividing the DRAM into multiple banks improves the bandwidth of the part when accessing highly random or separated addresses. While one latch accesses data from a row in one bank, another latch may simultaneously access the next request from a row of another bank. Such a design may support as many simultaneous active fetches as there are banks. This technique, however, only accommodates access to one row of any particular bank at one time. Additionally, dividing standard DRAMs into multiple banks requires substantially higher gate counts, die sizes and incremental costs.

Another substantial limiting characteristic of high bandwidth DRAMs is internal power consumption and the associated heat dissipation. The majority of this power consumption occurs upon row addressing, and the potential for simultaneous row accesses increases with multiple bank DRAMs and multiple DRAM systems. Therefore, the system memory controller must be equipped with additional circuitry for the scheduling row addressing to reduce worst case system power and noise characteristics.

Specialized devices (e.g., Video DRAM and RDRAM®) have succeeded in providing significantly enhanced bandwidth, however, such devices are designed for specific applications. Additionally, such devices typically require substantially greater die area than standard DRAMs. Such devices also lack the necessary general purpose operability to compete with standard DRAMs. Consequently, these specialized devices have failed to be competitive in cost per-bit, and to secure a major segment of the overall DRAM market.

AB the total number of devices required to implement a typical memory system declines, the need for increases in bandwidth per package becomes more urgent. Many cases render the traditional solution of obtaining higher bandwidth from the parallel access of a large number of devices impossible. In multimedia systems, the integration of video and graphics requires reading and writing the entire memory at least 60 times per second, which at the 64 megabit generation requires a sustained bandwidth of 1 Gbyte per second.

State of the art technology, therefore, requires a solution that optimizes bandwidth per package pin, thereby minimizing total pin count, with robust, low noise electrical signaling. The solution must provide sustainable performance for a broad range of access patterns, from the simple sequential methods typically required for graphics frame buffers to the chaotic address streams of unified memory architecture systems and multiprocessors. Furthermore, the solution must achieve these milestones at minimal incremental cost, die area and power consumption over current devices, and achieve compatibility with typical low cost, modest pin count packaging.

It is therefore an object of the present invention to provide a DRAM with a high bandwidth interface and transfer protocol, operating at data transfer rates in the range of 1 gigabyte/second to at least 2 gigabyte/sec in current CMOS technologies, with the ability to support multiple outstanding transactions.

It is a further object of the present invention to provide a DRAM with a high bandwidth interface and transfer protocol facilitating system configurations which minimize reflections created by multiple receivers on a single line.

It is yet a further object of the present invention to provide a DRAM with a high bandwidth interface and transfer protocol facilitating system configurations which eliminate the need for arbitration of transmission created by multiple transmitters on a single line.

It is yet a further object of the present invention to provide a DRAM with a high bandwidth interface and transfer protocol eliminating the need for complexity in system configurations.

It is yet a further object of the present invention to provide a DRAM with a high bandwidth interface and transfer protocol employing an on-chip memory buffer or cache to facilitate a direct connection to a host device and thereby reduce DRAM access time.

It is yet a further object of the present invention to implement a DRAM with a high bandwidth interface and transfer protocol utilizing a minimum number of gates required to operate the device at maximum clock rates of at least 1 gigahertz.

It is yet a further object of the present invention to implement a DRAM with a high bandwidth interface and transfer protocol at a low incremental cost over standard DRAMs.

It is yet a further object of the present invention to separate the high bandwidth interface from the DRAM core with a memory buffer or cache which is independently controlled by each interface and thereby completely separates the two domains enabling them to operate independently.

It is yet a further object of the present invention to provide a DRAM with a high bandwidth interface which includes a general purpose serial bus interface for conveying configuration information to the device to make any necessary adjustments for reliable operation at maximum data rates of at least 2 gigabytes per second point-to-point, or for configuring the device for operation in systems of varying performance characteristics and configurations.

It is yet a further object of the present invention to provide a DRAM with a high bandwidth interface which includes programmable skew, signal voltage swing differential and termination impedance values.

It is yet a further object of the present invention to provide a DRAM with a high bandwidth interface with a write buffer to enhance bandwidth by increasing the potential number of outstanding requests per device and permitting optimum scheduling for outstanding write requests.

SUMMARY OF THE INVENTION

The present invention has been developed so as to overcome the aforementioned drawbacks of the known methods and apparatus for increasing the bandwidth of memory devices.

Accordingly, the present invention generally relates to a memory chip for storage and retrieval of data transmitted as streams of data at sustained peak data transfer rates. The memory chip of the present invention comprises a memory means for decoding, arbitrating between, executing memory access commands and generating memory access responses, and a high bandwidth data interface coupled with the memory means. In a first embodiment, the memory means comprises a dynamic random access memory array coupled with a memory array controller. The high bandwidth interface comprises a data path, coupled with a packet buffer and a plurality of memory controllers, for receiving and transmitting input and output data streams, respectively. The plurality of memory controllers are coupled with the packet buffer for controlling the flow of the input and output data streams within the memory chip. The packet buffer is coupled between the data path and the memory means for temporarily storing data from the input and output data streams.

In another embodiment, the present invention generally relates to a memory chip comprising a multiple bank DRAM for dynamic storage and retrieval of data and a high bandwidth interface for receiving and transmitting data streams. The high bandwidth interface includes a data path comprising a unidirectional input port including a plurality of input receivers for receiving 8 parallel differential input data signals and an input clock signal, and a unidirectional output port comprising a plurality of output drivers for driving 8 parallel differential output data signals and an output clock signal. The data path is operable for receiving and transmitting data streams at sustained peak rates. The high bandwidth interface further includes a plurality of memory controllers, coupled to the data path, for transferring stored data from the DRAM to the data path for transmitting and for transferring data received from the data path to the DRAM for storage, and a memory element coupled to the plurality of memory controllers and the DRAM. The memory element being operative for temporary storage of memory access command and response information and forwarding data.

The present invention also relates to a method for processing streams of data. The method comprises the steps of receiving a stream of unified media data, including presentation, transmission and storage information, dynamically partitioning the unified stream of media data into component fields of at least one-bit based on the elemental symbol size of data received, and processing the unified stream of media data at substantially peak operation.

As discussed in detail below, the memory chip of the present invention provides important advantages over known devices. Most importantly, the present invention provides a memory chip having increased bandwidth capability, as compared to known devices, while simultaneously minimizing the die area, power consumption and pin count of the device.

The invention itself, together with further objects and attendant advantages, will best be understood by reference to the following detailed description, taken in conjunction with the accompanying drawings.

BRIEF DESCRIPTION OF THE DRAWINGS

FIG. 10 illustrates a general flowchart of the method for processing a stream of data of the present invention.

DETAILED DESCRIPTION OF THE PREFERRED EMBODIMENTS

Figure 1:
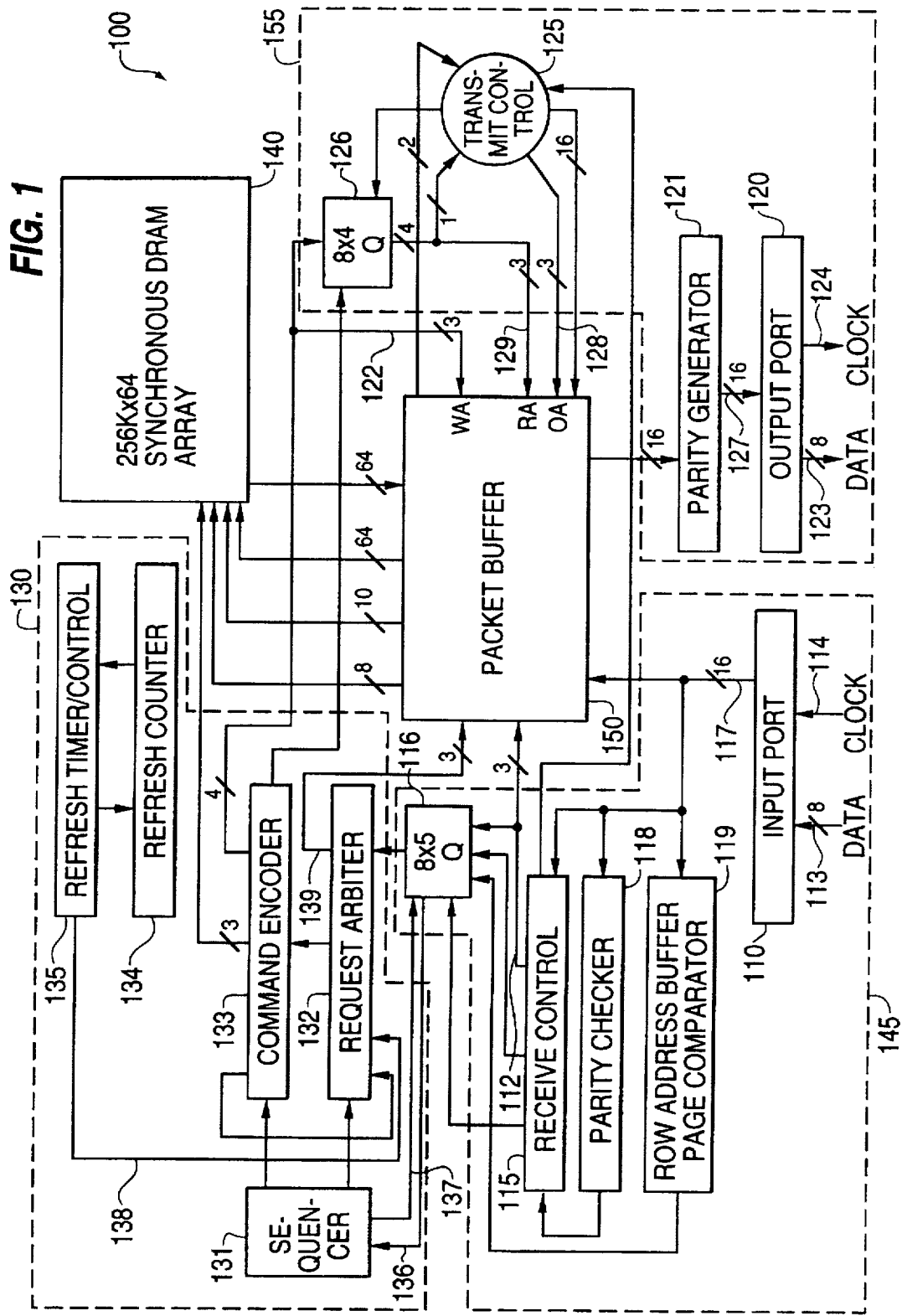
FIG. 1 represents a block diagram of a first embodiment of the memory chip of the present invention.

Referring to the drawings, where like reference numerals refer to like elements throughout, FIG. 1 presents an exemplary block diagram of a first embodiment of the memory chip 100 of the present invention. The memory chip 100 of the present invention incorporates a 256K×64-bit memory array or synchronous dynamic random access memory ("DRAM") array 140 and memory array controller or DRAM controller, with an on-chip high bandwidth interface. The DRAM controller 130 comprises control sequencer 131, request arbiter 132, command encoder 133, refresh counter 134 and refresh timer/control 135. The high bandwidth interface is logically divided into three sections: (1) packet buffer 150; (2) receiver section 145—comprising an input port 110, receive control circuit 115, request queue 116, receive parity checker circuit 118 and page mode comparator circuit or row address comparator circuit 119; and transmitter section 155—comprising output port 120, transmit parity generator circuit 121, transmit control circuit 125 and transmit queue 126. The input port 110 receives, and the output port 120 transmits, data and clock information as parallel signals for interfacing the memory chip 100 to a host and/or additional slave devices, as described in detail below.

The high bandwidth interface transfers data on both the rising and falling edges of the clock signal, with timing which makes the clock equivalent to a data line transferring an alternating pattern of 0 and 1 data values. The interface uses differential signaling which eliminates problems of clock asymmetry and minimizes the dependence of interconnect impedance on the distance to the ground plane. Additionally, since differential signaling eliminates the image return current through the ground path, discontinuities are acceptable. Moreover, the interface runs at constant frequency and contains no auxiliary control, handshaking or flow-control information, and the use of one-way, no-handshake links eliminates constraints on link length or timing.

The input port 110 receives an 8-bit input data stream 113, and a differential input clock 114. The 8-bit input data stream 113 comprises differential data-bits clocked on both the rising and falling edges of the input clock 114. The memory chip 100, however, processes the data as 16-bit receive data words 117, sampled only on the rising edges of input clock 114. The input port 110, therefore, includes an 8/16-bit demultiplexer (not shown in FIG. 1) which samples and holds the input data stream 113 with each edge of the input clock 114, switching between the upper and lower bytes, and converts the input data stream 113 to receive data words 117, managed as 16-bit words clocked only on the rising edges of input clock 114. The input port 110 then transfers the receive data words 117 to packet buffer 150, page mode comparator circuit 119, receive parity checker circuit 118 and receive control circuit 115.

Figure 2:
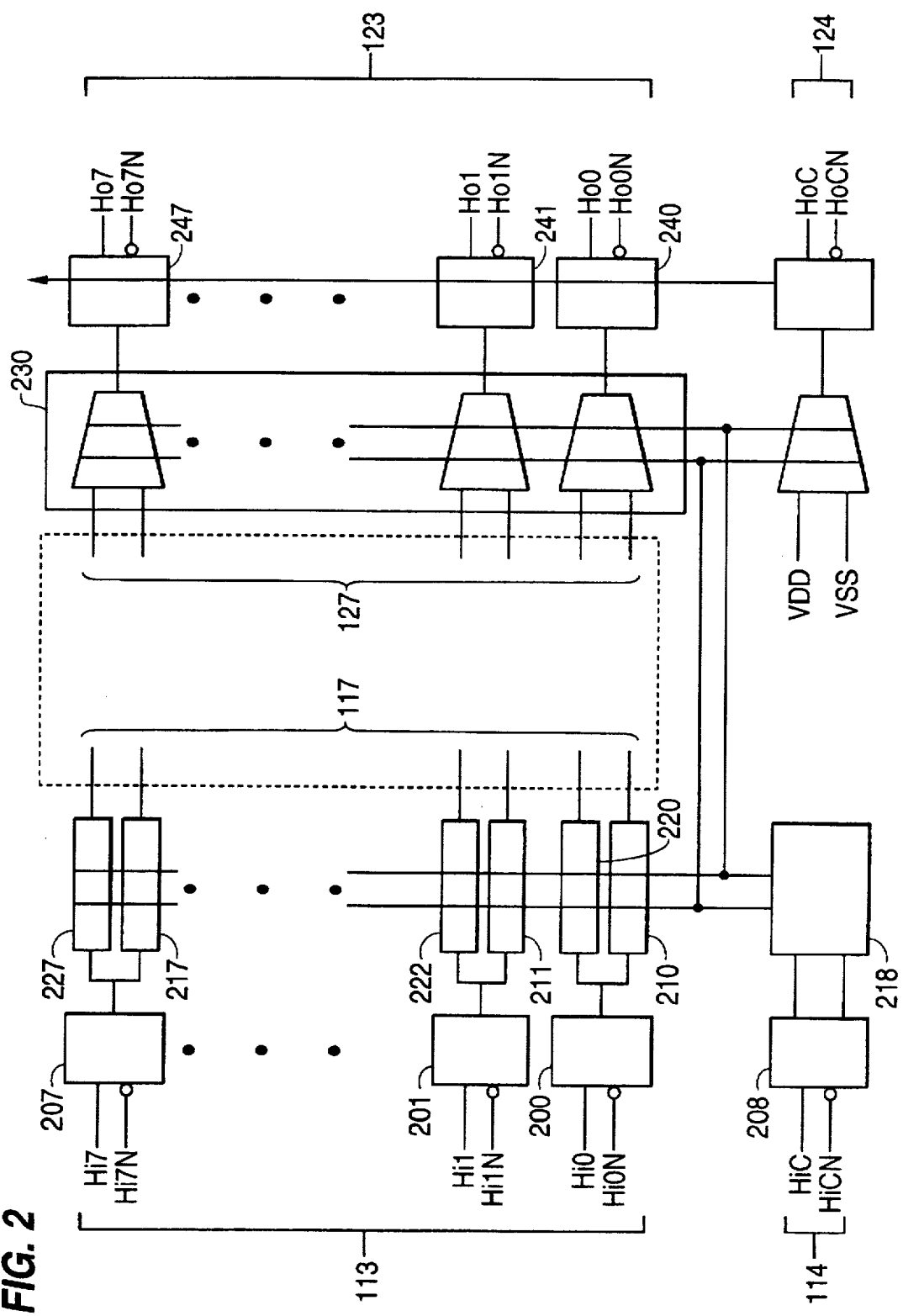
FIG. 2 represents a block diagram of an exemplary embodiment of the I/O structure of the memory chip of the present invention.

FIG. 2 illustrates an exemplary embodiment of the structure of the I/O circuitry (input and output ports 110 and 120) utilized by the high bandwidth interface 145. Nine input receivers 200–208 receive the input data stream 113 (HiO –Hi7 & HiON –Hi7N) and the input clock 114 (HiC & HiCN). The input clock 114 is transmitted through a quadrature delay 218, the output of which clocks the input data stream 113 into eight latches 220–227 on the rising edge of input clock 114, and clocks the input data stream 113 into eight latches 210–217 on the falling edge of input clock 114. The nine input receivers 200–208, together with the quadrature delay 218 and the sixteen latches 210–217 & 220–227, embodies the 8/16-bit demultiplexer referenced above.

Figure 3:
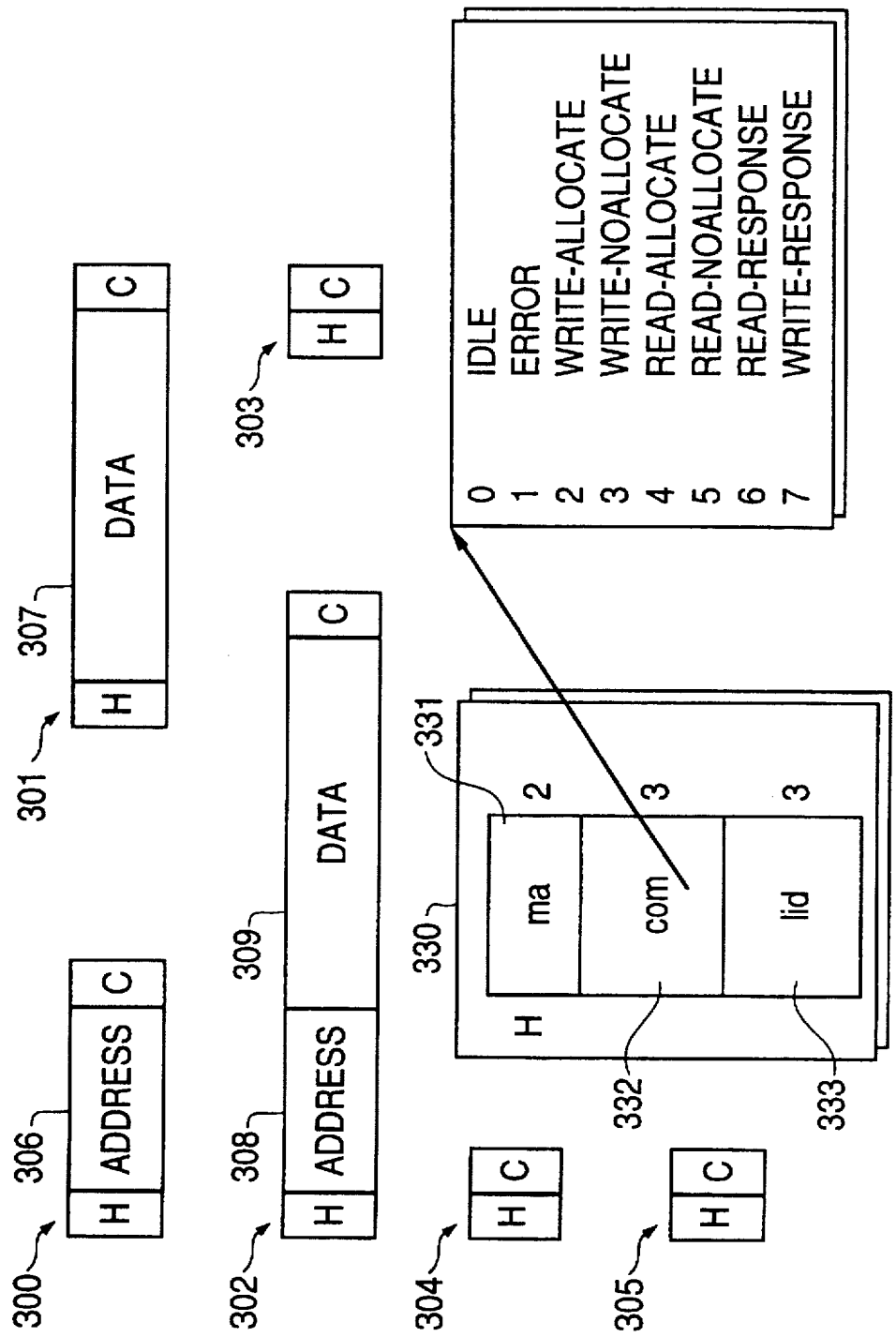
FIG. 3 illustrates an exemplary embodiment of the data processing protocol of the memory chip of the present invention.

FIG. 3 illustrates the logical level protocol utilized in the preferred embodiment of the present invention. The extreme simplicity of this protocol facilitates compact implementations and thereby permits operation at high clock rates which results in high bandwidth performance. The protocol embeds read and write operations to a single memory space in the form of packets 300–305. Each packet comprises at least a header byte H and check byte C. Nonidle read request 300 and write request 302 packets contain control information, address information and the associated data. Other packets consist of read responses 301, write responses 303 and error packet 304. During times when the device's output is idle, the output port 120 transmits idle packets 305, indicating an idle interface (e.g., between forwarding, response or error packets). The idle packet 305 preferably comprises an all zeros header byte H and an all ones check byte C. All packets transmitted by the output port 120 either begin during a clock period in which the output clock 124 is zero and end during a clock period in which the output clock 124 is one, or begin during a clock period in which the output clock 124 is one and end during a clock period in which the output clock 124 is zero.

The general form of each packet comprises an array of bytes beginning with the header byte H and ending with the check byte C. The header byte H of any given packet comprises a module address 331 in the high order two-bits, a command field 332 in the next three-bit positions and a link identifier 333 in the last three-bit positions, as illustrated by the header byte template 330 in FIG. 3. The interpretation of the remaining bytes of a packet depend upon the contents of the header byte H. The command field 332 specified in the header byte H implies the length of each packet, with a read request including a 4 byte address 306 and read response including an 8 byte read data word 307, and a write request including a 4 byte address 308 and an 8 byte write data word 309. The last byte of each packet comprises a check byte C computed as odd-bit-wise parity with a leftward circular rotation after accumulating each byte. This technique provides detection of all single-bit and some multiple bit errors, but no correction is provided.

The link identifier 333 serves as an identifier for each of up to eight outstanding transactions stored in the packet buffer 150. The header byte 330 of each response, either read response 301 or write response 303, contains the unique link identifier 333 of its associated request, which enables the host to identify a response as responsive to a particular request. The link identifier 333 thereby allows a host device to generate up to eight requests, each with a unique link identifier 333, prior to consuming the expected responses from the output port 120. The host manages the eight link identifiers and only reassigns a particular link identifier 333 for a particular device after receiving a response packet indicating the release of that link identifier 333 with respect to that device. Therefore, the host can generate requests sufficient to cover for the access latency of the DRAM array 140 without hampering the overall bandwidth of the memory chip 100.

The receive control circuit 115 operates as a finite state machine that detects the start of a new packet by monitoring the header byte H of a packet received from the input port 110. Upon detection of a non-idle packet (300, 301, 302, 303 or 304), the receive control circuit 115 checks the module address 331 to determine whether to write the packet to the packet buffer 150 as a forwarding packet or a request to that particular device, or whether to filter the packet out of the data stream as an idle packet 305. If a packet is addressed to the particular device, but comprises a read or a write response, then the device signals an error condition 304.

Additionally, as the receive control circuit 115 receives data, the receive parity checker circuit 118 computes a parity checksum and signals an error upon the detection of incorrect parity. The receive parity checker circuit 118 comprises two ranks of 8 exclusive OR ("XOR") gates and a feedback register which feed an accumulated value to the receive control circuit 115. The two ranks of XOR gates are wired such that the receive parity checker circuit 118 performs a single-bit rotate after each rank of XOR gates. The feedback register is initialized to zero upon receipt of an end indicator signaling the end of a packet, and remains at zero between packets. At the end of a packet, the receive parity checker circuit 118 expects a result of all ones from the second rank of XOR gates, otherwise it reports and error condition to the receive control circuit 115.

In the case where a packet comprises a request to that device, the receive control circuit 115 captures and holds the packet's link identifier 333, and writes the request to the packet buffer 150 at the location associated with the link identifier 333. Once a packet is written to the packet buffer 150, the receive control circuit 115 then writes the link identifier 333, along with two status bits (a read/write flag indicating the type of request, and an inpage flag indicating whether the request is to the same memory page as the previous request) to the request queue 116. The request queue 116 comprises an 8×5-bit FIFO which maintains the link identifier 333 of each of the outstanding requests, along with the two status bits, in the order received. The head of the request queue 116, together with a request signal 136 indicating that the request queue 116 contains valid data, is presented to the DRAM controller 130 signaling the presence of a request in the packet buffer 150. Upon accepting a request, the DRAM control sequencer 131 transmits an acknowledge signal 137 which pops the request queue 116.

Figure 4:
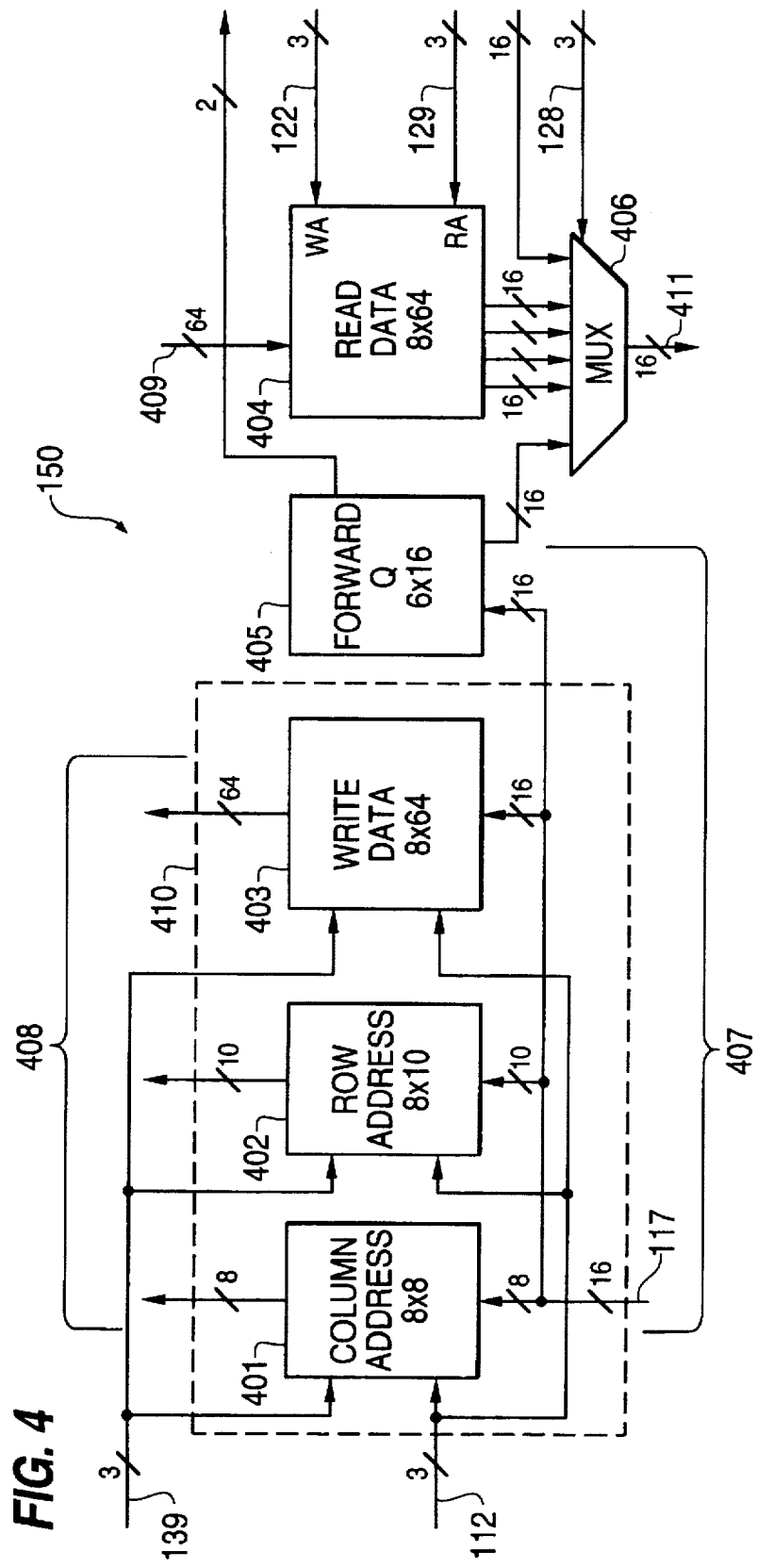
FIG. 4 represents a block diagram of an exemplary embodiment of the packet buffer of the memory chip of the present invention.

FIG. 4 illustrates a detailed block diagram of the packet buffer 150 which comprises an 8 entry dual-ported static random access memory ("SRAM") element (410 & 404), a forward queue 405 and a packet buffer multiplexer 406. The SRAM element of the packet buffer 150 is divided into a request buffer 410, which comprises an 8×8-bit column address buffer 401, an 8×10-bit row address buffer 402 and an 8×64-bit write data buffer 403, and a response buffer 404, which comprises an 8×64-bit read data buffer. The receiver section 145, DRAM controller 130 and DRAM array 140 utilize the request buffer 410 for the storage and servicing of pending read and write requests 300 and 302 to that device, while the transmitter section 155, DRAM controller 130 and DRAM array 140 utilize the response buffer 404 for the storage of read response data 307. The packet buffer 150 stores a pending request packet's addressing information and write data word 309 prior to the DRAM controller 130 servicing it, and stores read data words 307 and forwarding packets prior to the transmitter section 155 outputting them.

The receiver section 145 stores outstanding memory access requests in the request buffer 410 via a dedicated write port 407, and indexes into the request buffer via the three write address lines 112. The receiver section 145 stores a request packet's 8-bit column address in the column address buffer 401, 10-bit row address in the row address buffer 402 and 64-bit write data word 309 (in the case of a write request) in the write data buffer 403 as the data arrives (8-bits followed by 3 16-bit words, followed by 8-bits). After the receiver section 145 stores sufficient information in the request buffer 410 for the DRAM controller 130 to begin servicing the request, the receiver section 145 signals the DRAM controller 130 by pushing the request's link identifier 333 and two status bits (discussed above) onto the request queue 116.

The DRAM controller 130 accesses pending requests via its own dedicated read port 408 into the request buffer 410 memories, and indexes to the proper request through the link identifier 333 read from the request queue 116. The request arbiter 132 provides the proper index address via the three read address lines 139. The row and column address buffers 402 and 401 provide the DRAM array 140 row and column addresses for read and write requests 300 and 302, and the write data buffer 403 provides the write data word 309 for a write request 302. After servicing a read request 300, the DRAM controller 130 writes the read data word 307 retrieved from the DRAM array 140 to the read data buffer 404, and pushes the read response 301 link identifier 333 and read/write status bit onto the response queue 126. The DRAM controller 130 accesses the read data buffer 404 via its own dedicated write port 409, controlled by the three write address lines 122. Also, after the completion of a write to the DRAM array 140, the DRAM controller 130 pushes the write response 303 link identifier 333 and read/write status bit onto the response queue 126.

The DRAM array 140 of the present invention includes additional capacity for on-chip error correction ("ECC"), and includes an ECC generator and checker. On-chip ECC detects and corrects single-bit memory array errors, and thereby increases DRAM reliability without affecting device interoperability. Moreover, the fixed read and write data word widths alleviate the need for the ECC to perform read-modify-write operations, required with ECC operation for existing devices, when executing writes of different data sizes.

The DRAM controller 130 utilizes a 2 ns channel clock to control the sequencing of its operation, and the DRAM array 140 can accept a new request every 8 ns. The control sequencer 131 comprises a 4 state ring counter controlling the operation of the DRAM controller 130 as follows: (State 2) control sequencer 131 samples the current state of the request signal 136 from the request queue 116; (State 3) request arbiter 133 arbitrates between potential commands based on past history constraints (discussed below) and pre-decodes the request identifier from request queue 116; (State 0) DRAM controller 130 reads the associated row, column and data information from buffers 401, 402 and 403 at the location pre-decoded in State 3; (State 1) DRAM controller 130 executes DRAM command and pops the request queue 116 with acknowledge signal 137. If the request queue 116 is empty when sampled in State 2 and there are no active commands in the DRAM, then the control sequencer 131 pauses in State 2, and generates a pause flag which can be used by external logic to shut-down clocking in the DRAM controller 130 until either a new request is pushed onto the request queue 116 or the refresh counter 134 requests a refresh. Additionally, the control sequencer 131 generates the DRAM clock by OR-ing together States 0 and 1 and delaying that signal by 1.5 clock cycles. A one clock delay ensures that the DRAM clock, which is normally high during States 1 and 2, remains low when the control sequencer pauses in State 2, and a half clock ensures at least 1 ns of setup time relative to the availability of the data and command in State 1.

The request arbiter 132 determines the priority of pending requests based on the type of request and past history constraints from prior commands still active in the DRAM array 140. The request arbiter 132 analyzes whether pending requests are read or write (read/write bit from request queue 116) and whether they address the same page as the prior request (inpage bit from request queue 116), and sets a priority based on the type of command executable by the DRAM array 140 in view of the prior command. The request arbiter 132 performs this function in a maximum of 2 ns ensuring the ability to control access to the packet buffer 150 on the following clock (State 0). After the control sequencer 131 pops the request queue 116 in State 1, the queue's output to the request arbiter 132 remains stable until the beginning of State 3, and thus the request arbiter's outputs need not be registered. The request signal 136, however, toggles when the control sequencer 131 pops the request queue 116.

The encoder function of the command encoder 133 determines the state transition for non-timing critical signals (e.g., refresh and precharge) in parallel with the operation of the request arbiter 132. Once the request arbiter 132 resolves the state of read, write and activate operations to the DRAM array 140, the encoder function of the command encoder 133 generates the next command to the DRAM array 140. The encoder function of the command encoder 133 also tracks the progress of previously issued commands ensuring that constraints are available for consideration by itself and the request arbiter 132. The command encoder 133 performs its encoder function in a maximum of 4 ns, including the 2 ns utilized by the request arbiter 132 in generating its inputs to the command encoder 133. The request arbiter's outputs should therefore be combined late in the logic of the encoder function of the command encoder 133. The outputs of the encoder function of the command encoder 133 are stable at the beginning of State 1, when the addressing and data information becomes available from the packet buffer 150, and the DRAM clock transitions to high 1 ns into State 1. In addition, the outputs from encoder function of the command encoder 133 and from the request arbiter 132 are purely combinatorial, and a state pipeline function of the command encoder 133 samples the next state information generated by its encoder function and by the arbiter during State 2, and advances by applying new state information to the encoder function and arbiter at the start of State 3.

The refresh counter 134 comprises a free running ring counter which divides the input clock 114 by four, creating a pulse every 8 ns. The 8 ns pulse loads the result of a 10-bit ripple counter which counts to 1950 prior to registering a flag that indicates the requirement for a refresh. The refresh timer/control 135 then issues a refresh request 138 to the request arbiter 132, and once the refresh is executed, the refresh timer/control resets the refresh counter 134 and restarts the refresh count.

The forward queue 405 comprises a 6 entry by 16-bit FIFO utilized for the storage of packet data not intended for that particular device, and outputs such data via read port 411. When the receiver section 145 receives a packet header H with a module address 331 addressing a different device, the receiver section begins pushing the packet data onto the forward queue 405 via write port 407. The forward queue 405 transmits two status signals, empty and last, to the transmitter section 155. The empty signal indicates the availability of forwarding data in the forward queue 405 for outputting. Last signals the last word of forwarding data which allows the transmitter section to begin processing its next step and compensate for gate or device delays.

The transmitter section 155 maintains the outputting of forwarding data from the forward queue as its highest priority function and thus services the forwarding queue 405 as its next step whenever forwarding data is available. The forwarding queue 405 thus contains 6 entries for a worst case timing scenario where forwarding data becomes available immediately after the transmitter section begins accessing read data word 307 from the read data buffer 404. The 64-bit read data word access would occupy the transmitter section 155 for 5 clock cycles. During this time, 5 words of forwarding data would accumulate in the forwarding queue 405, leaving a sixth word storage space to cover for worst case timing considering logic and device delays. The transmitter section 155 would then service the forwarding queue 405 until receiving the empty signal.

The transmitter section 155 operates in a cycle. If the forwarding queue 405 contains forwarding data, then the transmitter section 155 outputs that data until receiving an empty signal. At that time, the transmitter section 155 checks for error signals from the receiver section 145 and outputs any necessary error packets 305. The transmit control circuit 125 then checks the response queue 126 for completed response data from the DRAM array 140. If none of the potential sources contain available data, then the transmitter section 155 outputs idle packets 304. If the transmitter section 155 is idle during a cycle when the receiver section 145 is pushing forwarding data to the forward queue 405, then the push is canceled, and the forwarding data bypasses the forward queue 405 for immediate outputting.

The transmitter section 155 accesses completed response data from the packet buffer 150 via its own dedicated read port 411. The transmitter section 155 selects the appropriate response data by indexing into the packet buffer through the three read address lines 129. The read address lines address the packet buffer 150 according to the response's link identifier 333 received from the response queue 126. In the case of a read response 301, the transmitter section 155 accesses the read data word 307 by indexing into the read data buffer 404 according to the link identifier 333 and outputs the read response's header H, data 307 and checkbyte C, or in the case of a write response 303, outputs the write response's header H and checkbyte C. The transmit control circuit 125 controls the packet buffer multiplexer 406 through three output address lines 128, which selects the appropriate data path for read port 411.

The transmitter section 155 performs a parity calculation for outgoing data using a hardware configuration (transmit parity generator circuit 121) almost identical to the receive parity checker circuit 118. The transmit parity generator circuit 121 utilizes two ranks of 8 XOR gates with a single-bit rotation after each bank, and a feedback register. The feedback register is initialized to, and remains at, all ones between packets. After the last word of a packet is output to the transmit parity generator circuit 121, the output of the first rank of XOR gates is used to insert parity into the outgoing response packet. Since bytes in the second half of the data path must be delayed by a half clock cycle for multiplexing into the 8-bit output data stream 123, as discussed below, parity generation can be performed with no additional delay. The transmit parity generator circuit 121 inserts the parity byte as the last byte of each packet, except when the transmitter section 155 is outputting forwarding packet data.

The output port 120 receives a 16-bit transmit data word 127 which is clocked on the rising edge of output clock 124. The physical interface of the memory chip 100, however, expects an 8-bit output data stream 123 presented on both the rising and falling edges of output clock 124 (the same format as the input data stream 113 received by the input port 110). Therefore, the output port 120 includes a 16/8-bit multiplexer (not shown in FIG. 1) which samples the 16-bit output data words 127 on the rising edge of the output clock 124 and switches between the upper and lower bytes driving the 8-bit output data stream 123 on both the rising and falling edges of output clock 124. The output port 120 thereby transmits the output data stream 123, comprising eight differential data signals, and a differential output clock 124.

Referring back to FIG. 2, the 16-bit output data words 127 are multiplexed into an 8-bit output data stream 123 by the 16/8 multiplexer 230 which utilizes the clock output from the quadrature delay 218 for selecting its outputs. The output from the multiplexer 230 thus comprises an 8-bit differential output data stream 123, transmitted by output drivers 240–247 and clocked on both the rising and falling edges of the differential output clock 124. To minimize system power, a special non-critical bias supply VDDQ provides the power supply to the output drivers 240–247. The value of VDDQ is user determined within the range of 0.4 volts to 1.5 volts depending on the desired interface signal level and power dissipation. For example, with a 200 millivolt differential signal level and a 50 ohm on-chip termination at both the source and destination, each wire pair requires 4 milliamps (1.6 milliwatts) from a 0.4 volt bias supply VDDQ. In this case, the high signal level is 0.3 volts and the low signal level is 0.1 volts (¾ and ¼ of VDDQ respectively). Sensing the difference between high and low signal levels, both determined by the same instantaneous value of bias supply VDDQ at the source, noise and precision requirements on supply bias VDDQ are modest.

Figure 5:
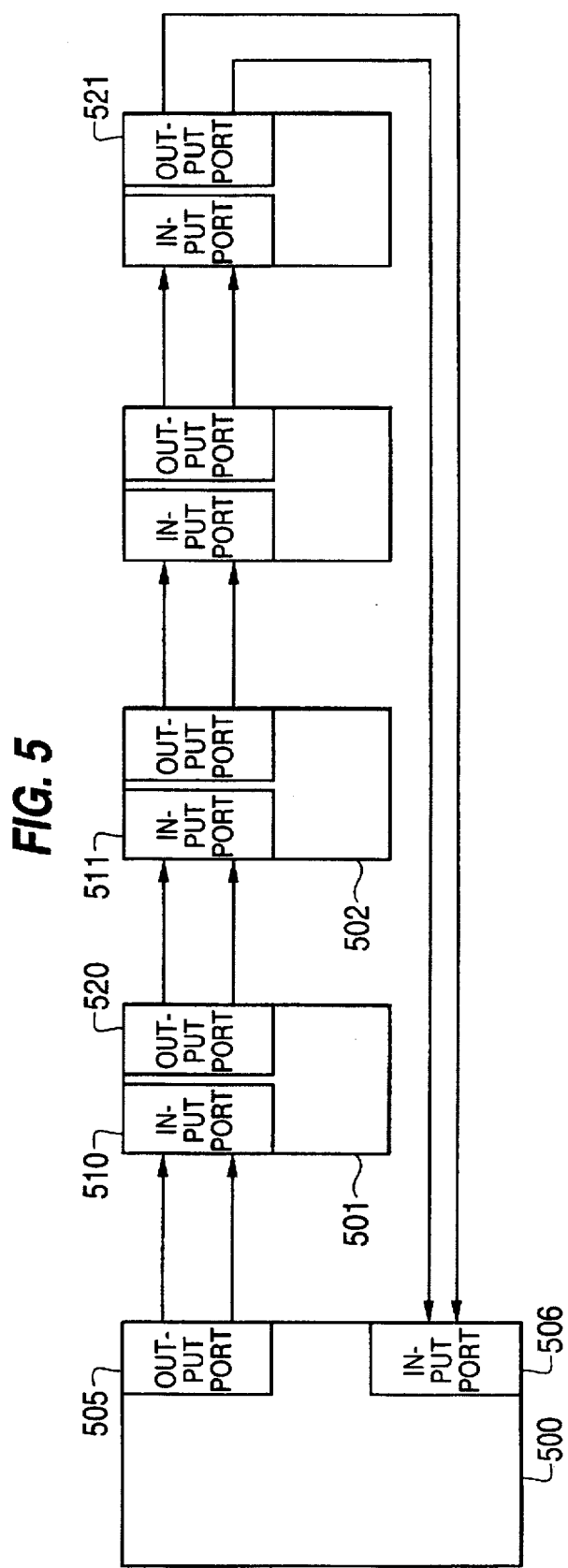
FIG. 5 represents a block diagram of the structure of an insertion ring containing 4 memory chips of the present invention and a host device.

The memory chip 100 of the present invention is designed for an insertion ring configuration of up to four devices, as shown in FIG. 5. In such a configuration, the input port 510 of the first device 501 interfaces with the output port 505 of the host device 500, and the output port 520 of the first device 501 interfaces with the input port 511 of the second device 502. This configuration of interfacing the input port of each device with the output port of the previous devices continues down the line, and finally the output port 521 of the fourth device interfaces with the input port 506 of the host device 500. The two-bit module address 331 permits up to four devices to be addressed in a single ring. Each device possesses its own unique module address 331 and only services requests with a matching module address 331. The module address 331 thereby serves as a device identifier, indicating to which device a particular request is directed, and instructs each device in the ring whether to service a particular packet or forward the packet to the next device in the ring. Each device inserts its responses between the transmittal of forwarding packets to other devices.

Figure 6:
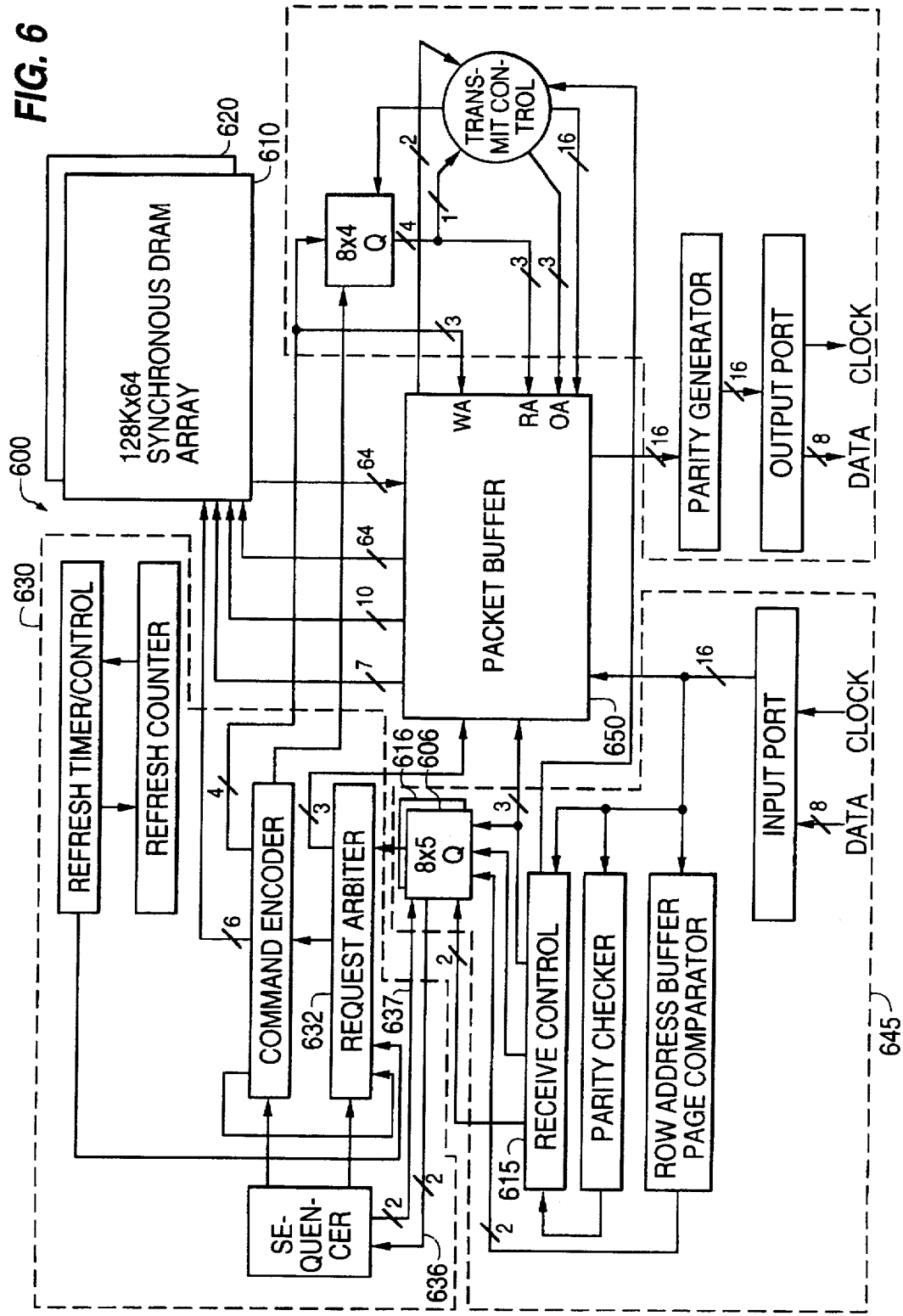
FIG. 6 represents a block diagram of a second embodiment of the memory chip of the present invention.

FIG. 6 illustrates a second exemplary embodiment of the memory chip of the present invention. The memory chip 600 of this embodiment incorporates two 128K×64-bit synchronous DRAM arrays 610 and 620 and DRAM controller 630, with the on-chip high bandwidth interface of the first embodiment. The operation of the memory chip 600 mirrors that of the memory chip 100 of the first embodiment except for some minor modifications to accommodate for the two DRAM arrays 610 and 620.

In this second embodiment, the receive section 645 includes two request queues 606 and 616, each associated with one of the two DRAM arrays 610 and 620. When a request packet is directed to that device, the receive control circuit 615 captures and holds the packet's link identifier 333, and writes the request to the packet buffer 650 at the location associated with the link identifier 333. Once the packet is written to the packet buffer 650, the receive control circuit 615 then writes the link identifier 333, along with two status bits (read/write flag and inpage flag, as described above) to the request queue 606 or 616 associated with the DRAM array which the particular request addresses. Each of the request queues 606 and 616 comprises an 8×5-bit FIFO which maintains the link identifier 333 of each outstanding request, along with the two status bits, in the order received, and operates as described above.

The packet buffer 650 of this second embodiment also comprises an 8 entry dual-ported SRAM element (410 and 404), a forward queue 405 and a packet buffer multiplexer 406, as shown in FIG. 4. The SRAM element of the packet buffer 650 is configured as illustrated in FIG. 4, however, the column address buffer comprises a 8×7-bit column address buffer because only seven column address bits are required by each of the DRAM arrays 610 and 620. The operation of the packet buffer 650 mirrors that of the packet buffer 150, as described above.

The other significant differences in the operation of the memory chip 600 of this second embodiment occur in the DRAM controller 630. The control sequencer 631 of this second embodiment comprises a 4 state ring counter controlling the operation of the DRAM controller 630 as follows: (State 2) control sequencer 131 samples the current state of the request signals 636 from the request queues 606 and 616; (State 3) request arbiter 632 arbitrates between potential commands to DRAM arrays 610 and 620 based on past history constraints (discussed below) and pre-decodes the request identifiers from the request queues 606 and 616; (State 0) DRAM controller 630 selects between pre-decoded identifiers, and reads the associated row, column and data information from buffers 401, 402 and 403 at the location pre-decoded in State 3; (State 1) DRAM controller 630 executes DRAM command and pops the appropriate request queue 606 or 616 with an acknowledge signal 637. If the request queues 606 and 616 are empty when sampled in State 2 and there are no active commands in the DRAM, then the control sequencer 631 pauses in State 2, as described above.

The request arbiter 632 determines the potential operations available with respect to each DRAM array 610 and 620, and determines the priority of pending requests based on the type of request and past history constraints. A two bank DRAM poses potential problems regarding power consumption, heat dissipation and noise characteristics associated with simultaneous page activate or row address strobe ("RAS") commands. The internal RAS scheduling of this second embodiment of the present invention reduces or limits the worst case power consumption, heat dissipation and noise characteristics by spacing out RAS commands, for different memory banks, scheduled simultaneously. The request arbiter 632 analyzes whether pending requests are read or write (read/write bit from request queues 606 and 616) and whether they address the same page as the prior request (inpage bit from request queues 606 and 616), and sets a priority based on the type of command executable by each DRAM array 610 and 620, affording an absolute priority to requests to one array. The request arbiter 632 also determines if a non-page mode operation requires activation of a page, and when both DRAM arrays 610 and 620 are free to issue a RAS command then the request arbiter 632 affords a higher priority to read requests over write requests. The request arbiter thereby allows execution of only one of the simultaneously scheduled RAS commands at a time.

In essentially all other respects the configuration and operation of the memory chip 600 of this second embodiment mirrors that of the memory chip 100 of the first embodiment.

Figure 8:
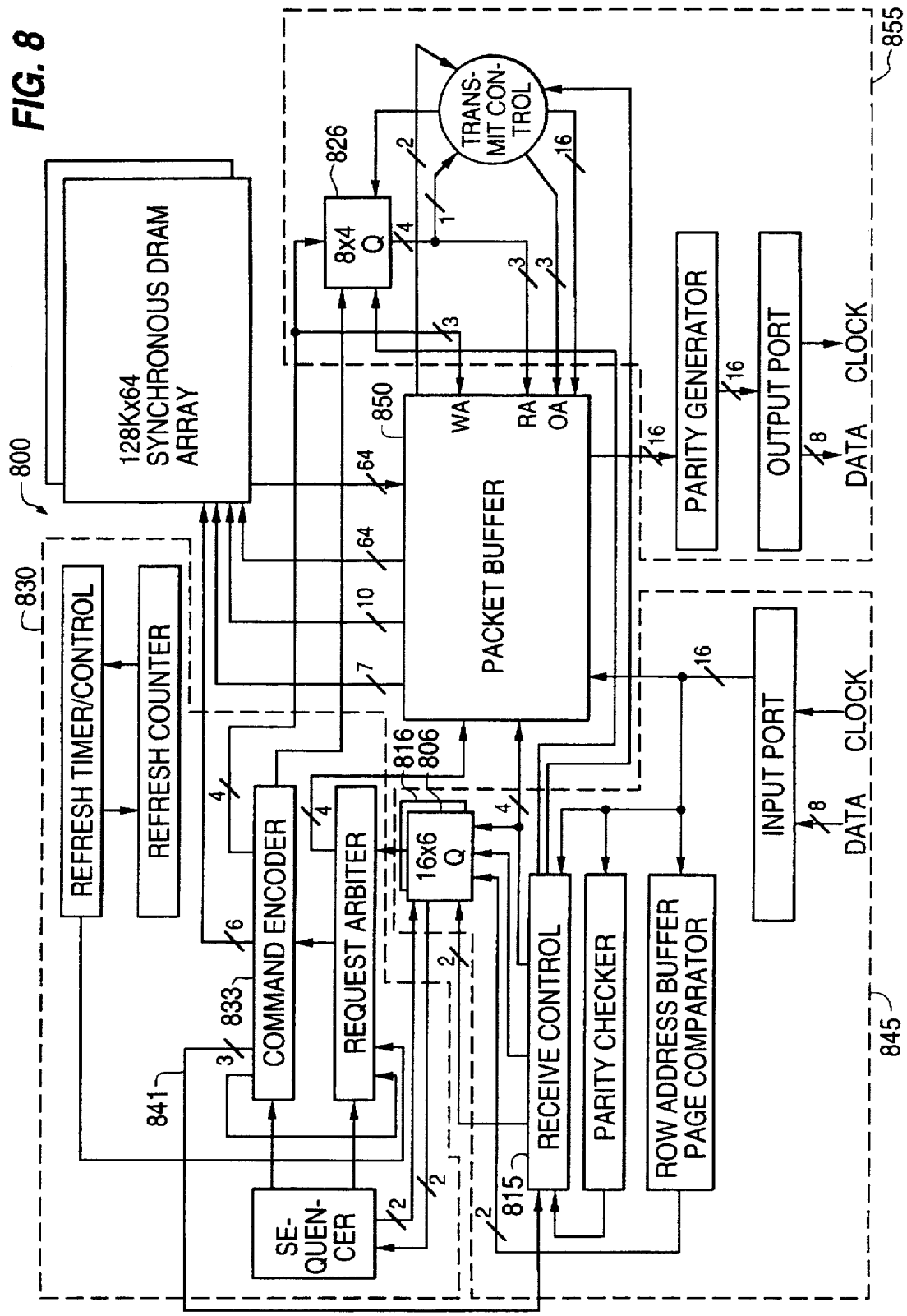
FIG. 8 represents a block diagram of a third embodiment of the memory chip of the present invention.
Figure 9:
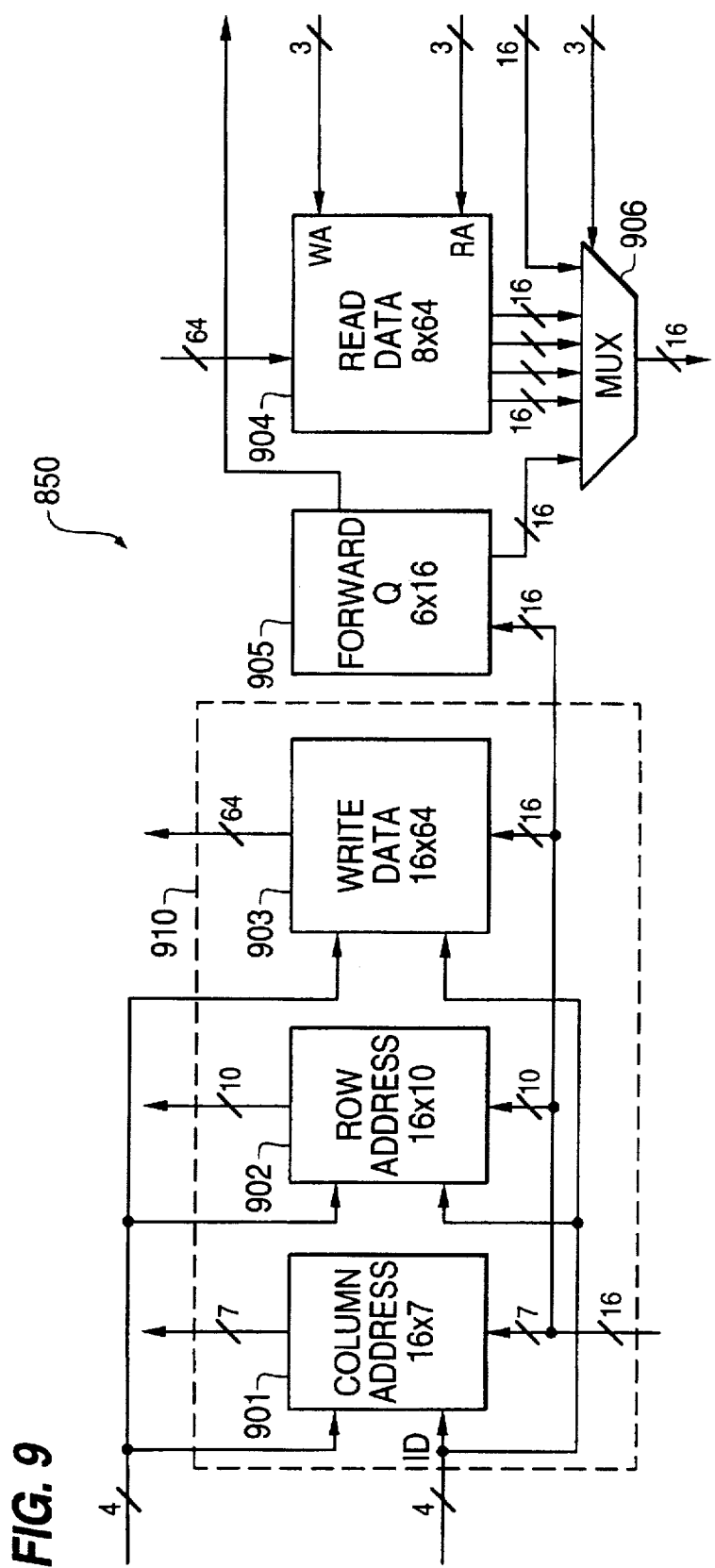
FIG. 9 represents a block diagram of an exemplary embodiment of the packet buffer of the memory chip of the third embodiment of the present invention.

FIGS. 8 and 9 represent block diagrams of the memory chip 800 and the packet buffer 850, respectively, of a third exemplary embodiment of the present invention. The memory chip 800 of this third embodiment provides the memory chip 600 of the second embodiment and includes a write request buffer comprising eight additional locations in the request buffer 910. The write request buffer stores up to eight additional write requests 302, releasing the associated space in the packet buffer 850 and the associated link identifiers 333, and thereby enables the host to transmit up to eight additional requests to a particular device. The packet buffer 850 of this third embodiment, like that of the second embodiment, also comprises an 8 entry dual-ported SRAM element (910 and 904), a forward queue 905 and a packet buffer multiplexer 906, as shown in FIG. 9. The request buffer 910, however, comprises a 16×7-bit column address buffer 901, an 16×10-bit row address buffer 902 and an 16×64-bit write data buffer 903, for accommodating the additional write requests in the write request buffer.

The receive control circuit 815 operates as described above, except in the case of a write request 302. Upon detection of a write request 302, the receive control circuit 815 assigns a 4-bit write ID corresponding to one of the eight locations in the write request buffer, and writes the request to the packet buffer 850 at the location associated with the 4-bit write ID. The write request buffer is preferably located at either the first eight locations or the last eight locations of the request buffer 910, and thus the most significant bit of the write ID is either 0 or 1, respectively. The receive control then pushes the 4-bit write ID, along with two status bits (a read/write flag and inpage flag, as described above) to the request queue, 806 or 816, associated with the DRAM array which the particular request addresses. In addition, the receive control 815 pushes the link identifier 333 of the write request, along with a read/write flag set so as to indicate its association with a write request, onto the response queue 826. The transmitter section 855 then outputs a write response 303, irrespective of whether the DRAM controller 830 has serviced the associated write request, which releases that particular link identifier 333 back to the host. If all eight locations in the write request buffer are full at the time the receive control circuit 815 receives an additional write request 302, then it treats that request as described above in the second embodiment.

Each of the request queues 806 and 816 comprises a 16×6-bit FIFO which maintains the write ID of each outstanding write request in the write request buffer, and the link identifier 333 of each of the other outstanding requests, along with the two status bits, in the order received. The DRAM controller 830 operates and interfaces with the receiver section 845 as described above in the second embodiment, indexing into the request buffer 910 according to the identifiers stored in the request queues 806 and 816, except when the DRAM controller accesses a write request from the write request buffer. In that instance, the DRAM controller 830 executes the write request and pops the appropriate request queue 806 or 816, as in the second embodiment, however, the DRAM controller 830 does not push the link identifier 333 onto the response queue 826 since that operation was carried out by the receive control circuit 815 upon receipt of the request. Instead, the command encoder 833 releases the associated write ID, via signal lines 841, back to the receive control circuit 815 for use with another write request 302.

In essentially all other respects the configuration and operation of the memory chip 800 of this third embodiment mirrors that of the memory chip 600 of the second embodiment.

A fourth embodiment of the present invention incorporates a general purpose serial bus interface with either the memory chip 100 of the first embodiment, the memory chip 600 of the second embodiment or the memory chip of the third embodiment. This general purpose serial bus permits the conveyance of configuration information to on-chip configuration registers for making device adjustments to achieve reliable operation at maximum data rates (e.g., data rates of at least 2 gigabyte/sec). For example, skew between the signal outputs and the clock as seen at the receive section operates as a fundamental limit on the speed of the high bandwidth interface. The host, however, can program that skew, through the general purpose serial bus, to compensate for performance variations between devices due to manufacturing processes. Configuration registers consist of internal registers which provide an implementation-independent mechanism for controlling device configuration. The configuration registers include adjustability for voltage swing, termination impedance and skew calibration.

Voltage swing calibration registers control the voltage levels used for internal logic and memory. Eight-bit fields separately control the power and voltage levels used by the circuitry of the high bandwidth interface.

Configuration registers are also provided to control skew, termination impedance and output current. An output termination-bit is used to select whether the output circuits are resistively terminated. The output termination can either be set to a high impedance level or to a resistance equal to that of the input termination. The termination resistance field is then used to select the input port termination impedance. Programmable termination impedance values enable matching the input and output ports 110 and 120 with package and circuit characteristics. The output current field selects the current at which the output port is operated. The output voltage swing is a product of the composite termination resistance and the output current.

The memory chip of this fourth embodiment further includes programmable refresh and precharge timing. The serial bus provides access for a programmable precharge delay which creates flexibility for differing device implementations, and further enhances performance. In addition, the protocol provides for two different read requests and two different write requests (read/write allocate and read/write no-allocate), illustrated in FIG. 3. No-allocate operations indicate data that would likely be accessed only once (e.g., data normally associated with large transfers or I/O activity where the accesses are largely sequential), while allocate operations indicate data that would likely be accessed again. The memory chip of this fourth embodiment, therefore, can also accommodate for different precharge delays depending on the type of access requested.

Figure 7:
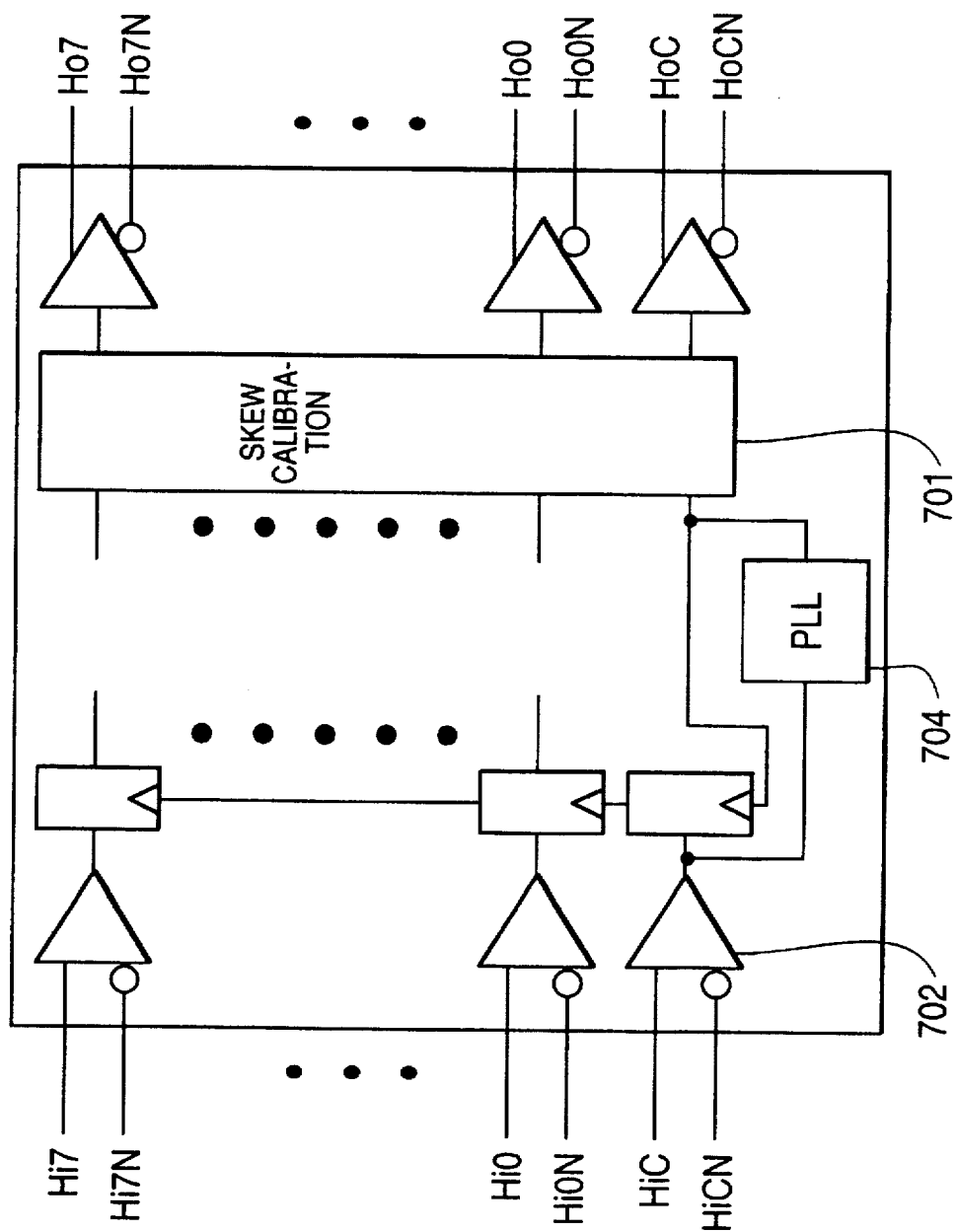
FIG. 7 represents a block diagram of an exemplary embodiment of the output signal skew calibrator of the memory chip of the present invention.

The memory chip of this fourth embodiment, as illustrated in FIG. 7, further includes a skew calibrator 701 and phase locked loop ("PLL") 704. The skew calibrator 701 is used to control skew in the output data stream 123. The configuration register provides two skew fields that individually control the delay between the output clock signal 124 and each of the eight signals in the output data stream 123. A b 3-bit analog skew field controls the power level, and thereby controls the switching delay of a single delay stage. Each of eight 3-bit digital skew fields sets the number of delay stages inserted in one of the eight signals in the output data stream 123 and in the internal clock signal clocking the output port. Setting these fields permits a fine level of control over the relative skew of the output data stream 123. The PLL 704 recovers the clock signal from the input receiver 702 and removes clock jitter. The input clock 114 comprises a single phase, constant rate clock and contains alternating zero and one values transmitted with the same timing as the data signals HiO-Hi7 and HiON-Hi7N. The clock signal frequency is one-half the byte data rate due to the clocking on both rising and falling edges of the clock signal.

A configuration register is also provided to control the fine tuning of the input port and output port configurations. The skew swing field controls the voltage swing used in input and output port skew circuits. The termination fine-tuning and process control fields control the analog bias settings for PMOS loads, in order to accommodate variations in circuit parameters due to the manufacturing process, and to provide intermediate termination resistance levels. The PMOS drive strength field is read only and indicates the drive strength, or conductance gain, of PMOS devices on the memory chip. This field is used to calibrate the power and voltage level configuration, given variations in process characteristics of individual devices.

The general purpose serial bus thus permits configuration of the DRAM with a high bandwidth interface of this fourth embodiment for operation in systems of varying performance characteristics and configurations, and enables fine tuning based on system level and device specific characteristics and achieve a peak bandwidth of at least 2 gigabytes per second.

The general purpose serial bus preferably employs two signals, both at TTL levels, for direct communication with the device. In the preferred embodiment, the first signal is a continuously running clock, and the second signal is an open-collector bi-directional data signal. Although the serial bus is designed for implementation in a system having a general purpose media processor as disclosed in U.S. patent application Ser. No. 08/516,036, as those skilled in the art will appreciate, the serial bus is applicable to other systems as well.

According to the preferred embodiment, the clock signal comprises a continuously running clock signal at a maximum of 20 megahertz. The amount of skew, if any, in the clock signal between any two serial bus devices should be limited to less than the skew on the data signal. The serial data signal comprises a non-inverted open collector bi-directional data signal.

The serial bus employs geographic addressing to ensure that each device is addressable with a unique number among all devices on the bus, and which also preferably reflects the physical location of the device. Thus, the address of each device remains the same each time the system is operated. In one preferred embodiment, the geographic address is composed of four-bits, thus allowing for up to 16 devices. In order to extend the geographic addressing to more than 16 devices, additional signals may be employed such as a buffered copy of the clock signal or an inverted copy of the clock signal (or both).

The serial bus preferably incorporates both a-bit level and packet protocol. The-bit level protocol allows a host device to transmit one-bit of information on the bus, which is received by all devices on the bus at the same time. Each transmitted-bit begins at the rising edge of the clock signal and ends at the next rising edge. The DRAM with high bandwidth interface of this third embodiment samples the transmitted-bit value at the next rising edge of the clock signal. According to the preferred embodiment, where the serial data signal is an open collector signal, the transmission of a zero-bit value on the bus is achieved by driving the serial data signal to a logical low value, and the transmission of a one-bit value is achieved by releasing the serial data signal to obtain a logical high value.

The packet protocol employed with the serial bus uses the-bit level protocol to transmit information in units of eight-bits or multiples of eight-bits. Each packet transmission begins with a start-bit comprising of a zero (driven) signal value. After transmitting the eight data-bits, a parity-bit is transmitted. The transmission continues with additional series of 8 data-bits followed by a parity-bit. A single one (released)-bit is transmitted immediately following the least significant-bit of each byte signaling the end of the byte.

On the cycle following the transmission of the parity-bit, any device may demand a delay of two cycles to process the data received. The two cycle delay is initiated by driving the serial data signal (to a zero value) and releasing the serial data signal on the next cycle. Before releasing the serial data signal, however, it is preferable to insure that the signal is not being driven by any other device. Further delays are available by repeating this pattern.

A serial bus transaction comprises the transmission of a series of packets. The transaction begins with a transmission by the transaction initiator, which specifies the target network, device, length, type and payload of the transaction request. The transaction terminates with a packet having a type field in a specified range. As a result, all devices connected to the serial bus should monitor the serial data signal to determine when transactions begin and end. In order to avoid collisions, a device is not permitted to start a transmission over the serial bus unless there are no currently executing transactions. To resolve collisions that may occur if two devices begin transmission on the same cycle, each transmitting device monitors the bus during the transmission of ones (released-bits). If any of the-bits of the byte are received as zero when transmitting a one, the device has lost arbitration and must cease transmission of any additional-bits of the current byte or transaction.

Of course, it should be understood that a wide range of changes and modifications can be made to the embodiments and various options described above. For example, as opposed to the DRAM memory, the high bandwidth interface of the present invention can be integrated with any suitable memory means. It is therefore intended that the foregoing detailed description be regarded as illustrative rather than limiting and that it be understood that it is the following claims, including all equivalents, which are intended to define the scope of the invention.

What is claimed is:

1. A memory chip, comprising:
   a memory array that decodes, arbitrates between, and executes memory array access commands, and for generates memory array access responses; and
   a high bandwidth data interface, coupled with the memory array, comprising;
   a data path, an interface controller, and a packet buffer,
   said data path is coupled with the packet buffer and interface controller, and receives an input data stream through an input port and transmits an output data stream through an output port,
   said interface controller is coupled with the packet buffer, and controls flow of the input and output data streams within the memory chip, and
   said packet buffer is coupled between the data path and the memory array, and temporarily stores data from the input and output data streams, and includes a data path through a forward queue that directly links the input port to the output for forwarding data through the packet buffer without being processed by the interface controller or memory array.

2. The memory chip of claim 1, wherein the memory array comprises a dynamic random access memory array coupled with a memory array controller.

3. The memory chip of claim 1, wherein the memory array comprises a static random access memory array coupled with a memory array controller.

4. The memory chip of claim 1, wherein the memory array includes an error circuit that performs single-bit error detection and correction.

5. The memory chip of claim 1, wherein the data path comprises an input port having a plurality of input receivers configured in parallel and an output port having a plurality of output drivers configured in parallel.

6. The memory chip of claim 1, wherein the interface controller comprises:
   a receiver section having a receive control circuit coupled with the data path and the packet buffer, and a request queue coupled between the receive control circuit, the packet buffer and the memory array; and a transmitter section having a transmit control circuit coupled with the packet buffer, and a response queue coupled between the transmit control circuit, the packet buffer and the memory array.

7. The memory chip of claim 1, wherein the packet buffer comprises a static random access memory.

8. A memory chip for storage and retrieval of data transmitted as streams of data at sustained peak data transfer rates, comprising:

a memory array, coupled with a memory array controller, that decodes, arbitrates between, and executes memory array access commands, and generates memory array access responses; and a high bandwidth data interface, coupled with the memory array and the memory array controller, comprising;

a unidirectional input port, a unidirectional output port, a packet buffer, and an interface controller that includes a receiver section and a transmitter section, said unidirectional input port is coupled with the packet buffer and the receiver section, and receives an input data stream comprising memory array access commands, forwarding data and an input clock signal, said unidirectional output port is coupled with the packet buffer and the transmitter section, and transmits an output data stream comprising memory array access responses, forwarding data and an output clock signal, said receiver section is coupled with the packet buffer and the memory array controller, and decodes and controls flow of the input data stream from the input port to the packet buffer, and to the memory array and the memory array controller, said transmitter section is coupled with the packet buffer and the memory array controller, and controls flow of the output data stream from the packet buffer to the output port, and said packet buffer is coupled between the input and output ports and the memory array, and stores the memory array access commands prior to servicing by the memory array and the memory array controller, and stores the memory array access responses and the forwarding data prior to servicing by the transmitter section, and includes a data path through a forward queue that directly links the input port to the output port for forwarding data through the packet buffer without being processed by the interface controller or memory array.

9. The memory chip of claim 8, wherein the input port comprises a plurality of input receivers configured in parallel, and the output port comprises a plurality of output drivers configured in parallel.

10. The memory chip of claim 9, wherein the input port further comprises a demultiplexer coupled with the plurality of input receivers, and the output port further comprises a multiplexer coupled with the plurality of output drivers.

11. The memory chip of claim 8, wherein;

the input port comprises nine input receivers that receive an input clock signal having both rising and falling edges, and receive eight parallel input data signals with said parallel input data signals being clocked on both the rising and falling edges of the input clock signal, said nine input receivers are coupled with an eight-bit to sixteen-bit demultiplexer that converts the eight parallel input data signals to sixteen parallel input data signals clocked only on either the rising or the falling edges of the input clock signal, and the output port comprises a sixteen-bit to eight-bit multiplexer, clocked by an output clock signal having both rising and falling edges, that converts sixteen parallel output data signals clocked only on either the rising or the falling edges of the output clock signal to eight parallel output data signals clocked on both the rising and falling edges of the output clock signal, said sixteen-bit to eight-bit multiplexer is coupled with nine output drivers, and transmits the eight parallel output data signals and the output clock signal.

12. The memory chip of claim 8, wherein;

the receiver section comprises a receive control circuit coupled with the input port and the packet buffer, and a request queue coupled between the receive control circuit, the packet buffer and the memory array controller, and the transmitter section comprises a transmit control circuit coupled with the packet buffer, and a response queue coupled between the transmit control circuit, the packet buffer and the memory array controller.

13. The memory chip of claim 12, wherein;

the receiver section further comprises a receive parity checker circuit coupled between the input port and the receive control circuit, and a row address comparator circuit coupled between the input port and the request queue, and the transmitter section further comprises a transmit parity generator circuit coupled between the packet buffer and the output port.

14. The memory chip of claim 12, wherein the request queue comprises an 8×5-bit static first-in-first-out memory array, and the response queue comprises an 8×4-bit static first-in-first-out memory array.

15. The memory chip of claim 8, wherein the packet buffer comprises a static random access memory array.

16. The memory chip of claim 8, wherein the packet buffer comprises an 8×146-bit static random access memory array and a 6×16-bit static first-in-first-out memory array.

17. The memory chip of claim 8, wherein the packet buffer comprises a 16×82-bit static random access memory array, an 8×64-bit static random access memory array and a 6×16-bit static first-in-first-out memory array.

18. The memory chip of claim 8, wherein the memory array comprises a dynamic random access memory array.

19. The memory chip of claim 8, wherein the memory array comprises a static random access memory array.

20. The memory chip of claim 8, wherein the memory array controller comprises a finite state machine which maximizes memory array access performance by arbitrating between memory array access commands and refresh requests based on memory array constraints.

21. The memory chip of claim 8, wherein the memory array and memory array controller include an error circuit that performs single-bit error detection and correction.

22. A memory chip for storage and retrieval of data transmitted as streams of data at sustained peak data transfer rates, comprising:

a plurality of memory arrays, coupled with a memory array controller, that decode, arbitrate between, and execute memory array access commands, and generate memory array access responses; and a high bandwidth data interface, coupled with the plurality of memory arrays and the memory array controller, comprising;

a unidirectional input port, a unidirectional output port, a packet buffer, and an interface controller that includes a receiver section, and a transmitter section, said unidirectional input port is coupled with the packet buffer and the receiver section, and receives an input data stream comprising memory array access commands, forwarding data and an input clock signal, said unidirectional output port is coupled with the packet buffer and the transmitter section, and transmits an output data stream comprising memory array access responses, forwarding data and an output clock signal, said receiver section, is coupled with the packet buffer and the memory array controller, and decodes and controls flow of the input data stream from the input port to the packet buffer, and to the plurality of memory arrays and the memory array controller, said transmitter section, is coupled with the packet buffer and the memory array controller, and controls flow of the output data stream from the packet buffer to the output port, and said packet buffer is coupled between the input and output ports and the plurality of memory arrays, and stores the memory array access commands prior to servicing by the plurality of memory arrays and the memory array controller, and stores the memory array access responses and the forwarding data prior to servicing by the transmitter section, and includes a data path through a forward queue that directly links the input port to the output port for forwarding data through the packet buffer without being processed by the interface controller or plurality of memory arrays.

23. The memory chip of claim 22, wherein the input port comprises a plurality of input receivers configured in parallel, and the output port comprises a plurality of output drivers configured in parallel.

24. The memory chip of claim 23, wherein the input port further comprises a demultiplexer coupled with the plurality of input receivers, and the output port further comprises a multiplexer coupled with the plurality of output drivers.

25. The memory chip of claim 22, wherein;

the input port comprises nine input receivers that receive an input clock signal having both rising and falling edges, and receive eight parallel input data signals with said parallel input data signals being clocked on both the rising and falling edges of the input clock signal, said nine input receivers are coupled with an eight-bit to sixteen-bit demultiplexer for converting the eight parallel input data signals to sixteen parallel input data signals clocked only on either the rising or the falling edges of the input clock signal, and the output port comprises a sixteen-bit to eight-bit multiplexer, clocked by an output clock signal having both rising and falling edges, that converts sixteen parallel output data signals clocked only on either the rising or the falling edges of the output clock signal to eight parallel output data signals clocked on both the rising and falling edges of the output clock signal, said sixteen-bit to eight-bit multiplexer is coupled with nine output drivers that transmit the eight parallel output data signals and the output clock signal.

26. The memory chip of claim 22, wherein;

the receiver section comprises a receive control circuit coupled with the input port and the packet buffer, and a plurality of request queues coupled between the receive control circuit, the packet buffer and the memory array controller, and the transmitter section comprises a transmit control circuit coupled with the packet buffer, and a response queue coupled between the transmit control circuit, the packet buffer and the memory array controller.

27. The memory chip of claim 26, wherein;

the receiver section further comprises a receive parity checker circuit coupled between the input port and the receive control circuit, and a row address comparator circuit coupled between the input port and the plurality of request queues, and the transmitter section further comprises a transmit parity generator circuit coupled between the packet buffer and the output port.

28. The memory chip of claim 26, wherein each of the plurality of request queues comprises an 8×5-bit static first-in-first-out memory array, and the response queue comprises an 8×4-bit static first-in-first-out memory array.

29. The memory chip of claim 22, wherein the packet buffer comprises a static random access memory array.

30. The memory chip of claim 22, wherein the packet buffer comprises an 8×145-bit static random access memory array and a 6×16-bit static first-in-first-out memory array.

31. The memory chip of claim 22, wherein the packet buffer comprises a 16×81-bit static random access memory array, an 8×64-bit static random access memory array and a 6×16-bit static first-in-first-out memory array.

32. The memory chip of claim 22, wherein the plurality of memory arrays comprise a plurality of dynamic random access memory arrays.

33. The memory chip of claim 22, wherein the plurality of memory arrays comprises a plurality of static random access memory arrays.

34. The memory chip of claim 22, wherein the memory array controller comprises a finite state machine which maximizes memory array access performance by arbitrating between memory array access commands and refresh requests based on memory array constraints.

35. The memory chip of claim 22, wherein the memory array and memory array controller include an error circuit that performs single-bit error detection and correction.

36. A high bandwidth data interface, comprising:

a data path, an interface controller, a slave port and a packet buffer;

said data path is coupled with the packet buffer and interface controller, and receives an input data stream through an input port and transmits an output data stream through an output port;

said interface controller is coupled with the packet buffer, and controls flow of the input and output data streams within the high bandwidth data interface; and said packet buffer is coupled between the data path and the slave port, and temporarily stores data from the input and output data streams and includes a data path through a forward queue that directly links the input port to the output port for forwarding data through the packet buffer without being processed by the interface controller.

37. The high bandwidth data interface of claim 36, wherein the input port comprises a plurality of input receivers configured in parallel, and the output port comprises a plurality of output drivers configured in parallel.

38. The high bandwidth data interface of claim 36, wherein;

the input port comprises nine input receivers that receive an input clock signal having both rising and falling edges, and receive eight parallel input data signals with said parallel input data signals being clocked on both the rising and falling edges of the input clock signal, said nine input receivers are coupled with an eight-bit to sixteen-bit demultiplexer that converts the eight parallel input data signals to sixteen parallel input data signals clocked only on either the rising or the falling edges of the input clock signal, and the output port comprises a sixteen-bit to eight-bit multiplexer, clocked by an output clock signal having both rising and falling edges, and converts sixteen parallel output data signals clocked only on either the rising or the falling edges of the output clock signal to eight parallel output data signals clocked on both the rising and falling edges of the output clock signal, said sixteen-bit to eight-bit multiplexer is coupled with nine output drivers that transmit the eight parallel output data signals and the output clock signal.

39. The high bandwidth data interface of claim 36, wherein the interface controller comprises:

a receiver section having a receive control circuit coupled with the data path and the packet buffer, and a request queue coupled between the receive control circuit and the packet buffer; and a transmitter section having a transmit control circuit coupled with the packet buffer, and a response queue coupled with the transmit control circuit and the packet buffer.

40. The high bandwidth data interface of claim 36, wherein the packet buffer comprises a static random access memory array.

41. A method for processing a stream of data received by a device as a plurality of input packets, said method comprising the steps of:

receiving an input packet, composed of a plurality of fixed bit length data fields, through an input port;

decoding the input packet, and processing the input packet by either executing the input packet as a request to the device, or forwarding the input packet, as an output packet, to another device through a forwarding path directly linking the input port to an output port, according to information conveyed by the plurality of fixed bit length data fields; and when the input packet is determined to be a request to the device, generating an output packet composed of a plurality of fixed bit length data fields, wherein at least one of the output packet's fixed bit length data fields corresponds with at least one of the fixed bit length data fields of one of the input packets.

42. The method for processing a stream of data of claim 41, wherein each input packet's plurality of fixed bit length data fields comprises a module address for addressing a particular device, a command field for specifying a request type, and a link identifier for linking a particular input packet with a particular output packet.

43. The method for processing a stream of data of claim 41, wherein each input packet and each output packet includes a checkbyte for error detection.

44. The method for processing a stream of data of claim 42, wherein the plurality of fixed bit length data fields of each input packet further comprises a request address.

45. The method for processing a stream of data of claim 44, wherein the plurality of fixed bit length data fields of each of certain input packets further comprises a write data word.

46. The method for processing a stream of data of claim 44, wherein the plurality of fixed bit length data fields of each of certain output packets further comprises a read data word.

* * * * *

UNITED STATES PATENT AND TRADEMARK OFFICE
CERTIFICATE OF CORRECTION

PATENT NO. : 5,778,419
DATED : July 7, 1998
INVENTORS : Hansen et al.

It is certified that error appears in the above-identified patent and that said Letter Patent is hereby corrected as shown below:

In the Claims: Column 16,

Claim 1, line 3, delete "for"; and
        line 19, after "output", insert --port--.

Signed and Sealed this

Ninth Day of May, 2000

*Attest:*

Q. TODD DICKINSON

*Attesting Officer*      *Director of Patents and Trademarks*